(12) United States Patent
Kimura et al.

(10) Patent No.: US 7,639,588 B2
(45) Date of Patent: Dec. 29, 2009

(54) OPTICAL DISC DRIVE APPARATUS

(75) Inventors: Shigeharu Kimura, Yokohama (JP); Takeshi Shimano, Yokohama (JP)

(73) Assignee: Hitachi Media Electronics Co., Ltd., Iwate-ken (JP)

( * ) Notice: Subject to any disclaimer, the term of this patent is extended or adjusted under 35 U.S.C. 154(b) by 504 days.

(21) Appl. No.: 11/669,223

(22) Filed: Jan. 31, 2007

(65) Prior Publication Data
US 2007/0268807 A1  Nov. 22, 2007

(30) Foreign Application Priority Data
May 16, 2006 (JP) .............................. 2006-136679

(51) Int. Cl.
*G11B 7/00* (2006.01)

(52) U.S. Cl. .............................. 369/110.04; 369/112.19

(58) Field of Classification Search ............ 369/110.02, 369/110.04, 110.03, 112.07, 112.16, 112.19
See application file for complete search history.

(56) References Cited

U.S. PATENT DOCUMENTS 5,790,501 A * 8/1998 Kase et al. ............. 369/110.04

FOREIGN PATENT DOCUMENTS

| JP | 2001-174983 | 12/2002 |
|----|-------------|---------|
| JP | 2002-367211 | 12/2002 |
| JP | 2005-302084 | 10/2005 |

OTHER PUBLICATIONS

N. Shida, et al., "Superlarge-Capacity Optical Disk with Multilayer Structure Fabricated Using a Photopolymer Sheet", Jpn. J. Appl. Phys., vol. 42, pp. 778-783, Feb. 2003.
T. Ogata, "Multi-Layer Disk Read-Out Technology Used Photonic Crystal", Optics Japan, 2005.
T. Ogata, et al., "Novel Read-Out Technology for Multi-Layer Disk Using Polarization Device", IEEE, pp. 31-33, 2006.

* cited by examiner

*Primary Examiner*—Nabil Z Hindi
(74) *Attorney, Agent, or Firm*—Antonelli, Terry, Stout & Kraus, LLP.

(57) ABSTRACT

The amount of reflected light from an adjacent layer in a multilayer optical disc is reduced by means of a combination of half-wave plates having different optical axes and a flat mirror. The polarization direction of the reflected light from a target layer is changed without changing the polarization direction of reflected light from the adjacent layer so as to detect a signal from the target layer alone. Because no stray light is introduced into the tracking error signal or focus signal, the laser light irradiated position can be controlled with high accuracy. This makes it possible to accurately determine the laser irradiated position during reading and writing, thereby enhancing signal quality. Because no reflected light from the adjacent layer is introduced into the data signal, a data signal with reduced error can be obtained.

7 Claims, 11 Drawing Sheets

OPTICAL DISC DRIVE APPARATUS

CLAIM OF PRIORITY

The present application claims priority from Japanese application JP2006-136679 filed on May 16, 2006, the contents of which are hereby incorporated by reference into this application.

BACKGROUND OF THE INVENTION

1. Field of the Invention

The present invention relates to an optical disc drive apparatus and particularly to a reading optical system.

2. Background Art

The capacity of a single layer in an optical disc largely depends on the wavelength of the semiconductor laser used and the numerical aperture (NA) of the objective lens. The shorter the wavelength of the semiconductor laser, or the larger the NA, the greater the recording density will be, with a resultant increase in the capacity of each layer. Most of the currently commercially available optical disc drives are DVD (Digital Versatile Disc) drives that employ the color of red with wavelengths in the vicinity of 660 nm and an objective lens having an NA of 0.6. Shipping has started of optical drives that exceed the recording density of DVDs, using a light source consisting of a semiconductor laser of blue-violet light with wavelengths in the vicinity of 405 nm and an objective lens with an NA of 0.85. Difficulty is expected for the development of a semiconductor laser light source having wavelengths shorter than those of such blue violet because the wavelengths would be in the UV range. Furthermore, since the limit of NA of an objective lens in air is 1, improvement in recording density by means of the objective lens is also becoming difficult.

Under such circumstances, use of multiple layers is suggested as a means of increasing the capacity of an individual optical disc. For example, Non-patent Document 1 discloses a ROM (Read Only Memory) having four layers. When a multilayer optical disc is irradiated with laser light, crosstalk between the layers becomes an issue because of the simultaneous irradiation of a plurality of layers. In order to address this problem, the interlayer distance is increased. In this way, crosstalk can be reduced because laser light is focused and layers other than a target layer are displaced from the position where the laser light is focused.

However, such increase in the interlayer distance gives rise to the problem of spherical aberration. Between the recording layers, polycarbonate is used, which has a refractive index different from that of air and thus poses a cause for spherical aberration. The objective lens is designed such that its spherical aberration is minimized with respect to a particular layer. As a result, spherical aberration is caused when the focus of laser light is shifted to any of layers other than the target layer. Such aberration can be normally corrected by placing an expander lens system consisting of two lenses in front of an objective lens. The aberration can also be corrected by varying the phase of a liquid crystal element or the distance between two lenses. However, it is impossible to correct large spherical aberration, given the possible range of compensation of the liquid crystal element or the need to realize a lens transfer mechanism within the small optical disc drive apparatus. Thus, it is difficult to achieve a sufficient increase in the interlayer distance in a multilayer optical disc for actual optical drive units. Consequently, some interlayer crosstalk inevitably remains in a multilayered optical disc.

In order to reduce the aforementioned crosstalk, in Patent Document 1, a minute mirror is disposed on the optical axis so as to obtain only the reflected light of interest and reduce crosstalk. This takes advantage of the fact that the position along the optical axis where the reflected light from a multilayer optical disc is focused by lenses differs between the reflected light from a target layer and that from an adjacent layer. In Non-patent Document 2, in order to reduce crosstalk from an adjacent layer, the reflected light from the multilayer disc is focused by a condenser lens. Two split wave plates consisting of a phase difference region of a + quarter-wave plate and a phase difference region of a − quarter-wave plate are disposed such that their directions are inverted with respect to each other, with the position of focus placed between them. Because the focal point of the reflected light from the target layer is sandwiched between the two split wave plates, the light only passes through either the plus $\lambda/4$ region or the minus $\lambda/4$ region of the two split wave plates twice, thus producing a phase difference $\lambda/2$ between the two polarization directions and rotating the polarization directions by 90°. The reflected light from an adjacent layer has its focus position located outside the two wave plates, so that it passes through both the plus $\lambda/4$ region and the minus $\lambda/4$ region. In this case, the phase difference caused by the split wave plates is cancelled and no phase difference is produced between the two polarization directions. Thus, the polarization direction of the reflected light from the adjacent layer is not changed. Such separation of polarization makes it possible to obtain the reflected light only from the target layer, so that crosstalk from an adjacent layer can be reduced. In this method, however, an optical element for polarization separation needs to be introduced into the optical system, resulting in an increase in the size of the optical system.

Patent Document 1: JP Patent Publication (Kokai) No. 2005-302084 A

Non-patent Document 1: Jpn. J. Appl. Phys. Vol. 42 (2003) pp. 778-783

Non-patent Document 2: Optics Japan 2005, 23aPD1

SUMMARY OF THE INVENTION

It is an object of the invention to reduce crosstalk in multiple layers without an associated increase in the size of an optical disc drive apparatus.

With reference to FIG. 3, crosstalk caused in a detection optical system in an optical disc drive apparatus due to a multilayer optical disc is described. In the following, numeral 501 designates a double-layer optical disc for simplicity's sake, and 511 and 512 designate information recording layers. The minimum beam spot of laser light from an objective lens 401 is located on the recording layer 511, as indicated by a laser beam 80. Namely, the information in the recording layer 511 is now about to be read. The reflected light from the recording layer 511, which is the intended light, returns back to the objective lens 401 through the same optical path as that of the incident light. The reflected light then passes through the detection lens 402 and is incident on a photodetector 51 as a light beam 81. Electric signals from the photodetector are processed by a signal processing circuit 61 into signals that are used for controlling the laser light irradiating position or into a data signal.

Multilayer discs are designed such that when the laser light is focused on each layer, each layer produces substantially the same amount of reflected light. Thus, the layers nearer to the objective lens have greater transmittance so that the layers farther from the objective lens can be irradiated with laser light. Under such circumstances, when the laser light is focused on the layer 511 from which information is to be read, some of the laser light passes through the layer 511 as a light beam 82 and is then reflected by the adjacent layer 512, resulting in a reflected light beam 83. The reflected light beam 83 returns to the objective lens 401 and is then incident on the detection lens 402. After being focused in front of the photodetector 51, the reflected light beam 83 is then incident on the photodetector 51 while it spreads, as indicated by a light beam 84. The light beam 84 is overlapped with the light beam 81 over the photodetector 51, resulting in an intensity distribution different from that obtained when only the light beam 81 is incident, due to the interference effect. Because this intensity distribution varies depending on the inclination of the optical disc or the interlayer distance, the tracking error signal, which is based on a differential, may lose balance and produce a tracking error.

If the adjacent layer 512 is located toward the objective lens from the target layer 511, reflected light is produced by the adjacent layer and a similar interference problem arises.

In order to overcome the aforementioned problems, the reflected light from an adjacent layer is prevented from entering the photodetector, so that there is no interference over the photodetector with the reflected light from the layer to be read. As a means for achieving that, two kinds of half-wave plates with different directions of optical axis and a flat mirror are used to cause the direction of polarization of the reflected light from an adjacent layer to be different from that of the reflected light from a target layer by 90°. The two reflected lights are thus separated based on the difference in polarization direction so as to avoid interference.

A split wave plate 70 shown in FIG. 4 consists of half-wave plates 71 and 72 with different optical axis directions that are joined at the position of a dividing line. When the direction of polarization of incident light is 61, the direction 62 of the optical axis of the half-wave plate 71 is inclined by approximately plus 22.5 degrees with respect to the polarization direction 61. The optical axis 63 of the other half-wave plate 72 is inclined by approximately minus 22.5 with respect to the polarization direction of the incident light. FIG. 5 shows the positional relationship among the split wave plate 70, the flat mirror 43, a position determined by the lock-on range of focus of the optical disc, and a minimum spot position of the reflected light from a multilayer disc. It is assumed that the reflected light from the multilayer optical disc having an optical axis 80 enters from top of the sheet of the drawing, and that the dividing line of the split wave plate 70 is perpendicular to the optical axis 80. Reflected light 81 is the reflected light from a target layer. The flat mirror 43 is disposed at the minimum spot position of the reflected light 81. A position 97 is at a distance of p×m$^2$ from the flat mirror 43 where p and m represent the focus lock-on range and the magnification of the optical system, respectively. A portion 85 is the minimum spot position of the reflected light 84 from an adjacent layer farther from the objective lens. The split wave plate 70 is disposed toward the flat mirror with respect to the spot position 85 and toward the objective lens with respect to the position of the dotted line 97.

The reflected light 81 from the target layer is reflected by the flat mirror 43 located at the minimum spot position such that it passes through both the half-wave plates 71 and 72. For example, if the reflected light is incident on the half-wave plate 71 as a beam 86, its polarization direction is changed by 45 degrees from 61 to 64, as shown in FIG. 6. If the reflected light is reflected by the flat mirror and passes through the half-wave plate 72 as a beam 87, its polarization direction is changed by minus 135 degrees by the polarizing plate 72 having an optical axis 63, as shown in FIG. 7, resulting in a polarization direction 65. Namely, the original polarization direction 61 is rotated by minus 90 degrees. If the reflected light 81 from the target layer is initially incident on the half-wave plate 72, the direction of rotation of polarization direction is merely reversed, such that the original polarization direction is rotated by a plus 90 degrees. Because the state of polarization produced by the rotations of polarization direction by plus and minus 90 degrees is the same as the original state of polarization, the state of polarization of the reflected light 81 from the target layer is rendered perpendicular to the original polarization direction by the split wave plate and the flat mirror.

On the other hand, the reflected light 84 from the adjacent layer is reflected by the flat mirror 43, as shown in FIG. 5, and it then passes through the same wave plate. For example, the beam 88 from the adjacent layer passes through the minimum spot position 85 and is then incident on the half-wave plate 71, whereby the polarization is changed from 61 to 64, as shown in FIG. 6. The beam is then reflected by the reflecting plate 43 and becomes a beam 89, which is incident on the same half-wave plate 71. At this point, the polarization of the outgoing beam 89 from the half-wave plate 71 is returned to the original state 61. Similarly, when the reflected light from an adjacent layer is incident on the half-wave plate 72, the polarization returns to the original state and so there is no change.

FIG. 8 shows a case where the reflected light is from an adjacent layer that is closer to the objective lens. The minimum spot of the reflected light 90 from the adjacent layer is located at position 91 as a virtual image. A beam 92 included in the reflected light 90 passes through the half-wave plate 71 twice, so that there is no change in its polarization direction. Similarly, a beam included in the reflected light 90 that initially passes through the half-wave plate 72 passes through the half-wave plate 72 for the second time, so that there is no change in polarization direction.

To summarize, the invention uses a split wave plate and a flat mirror to rotate the polarization direction of the reflected light from a target layer perpendicularly while the polarization direction of the reflected light from an adjacent layer is not changed. The two reflected lights can be separated with a polarization separating element, so that interference between them can be eliminated.

In accordance with the invention, light from the target layer alone can be made incident on a photodetector. This makes it possible to avoid the crosstalk caused by the overlapping of the reflected light from a target layer with the reflected light from an adjacent layer when reading recorded information from a multilayer disc. Thus, the quality of control signals or data signal can be improved.

DESCRIPTION OF THE PREFERRED EMBODIMENTS

In the following, preferred embodiments of the optical disc drive apparatus of the invention will be described with reference to the drawings.

Embodiment 1

Figure 1:
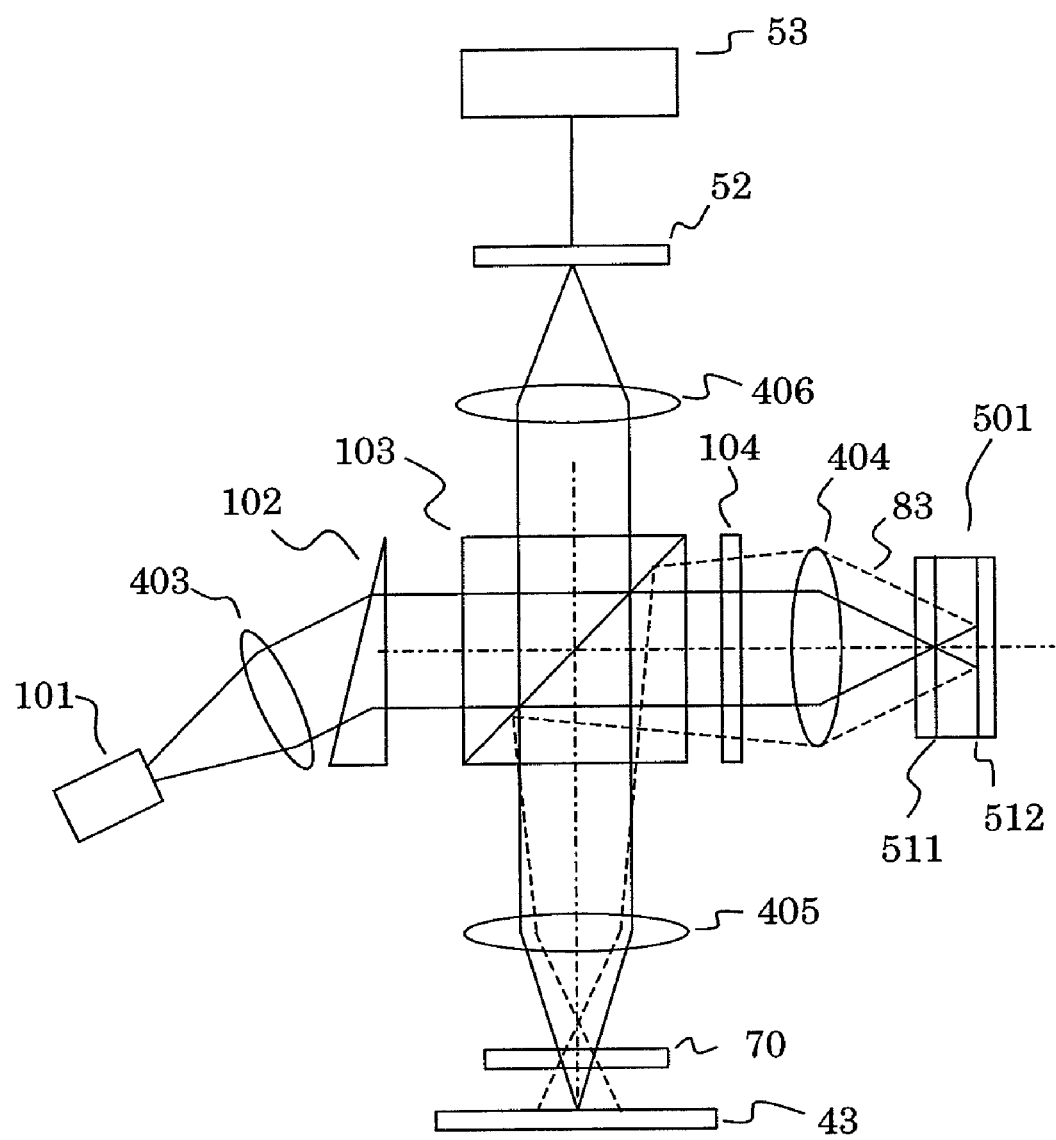
FIG. 1 shows an optical pickup portion of an example of the optical disc drive apparatus according to the invention.

FIG. 1 shows an optical pickup portion of an example of the optical disc drive apparatus of the invention. Laser light emitted by a semiconductor laser 101 is converted into a circular collimated light beam by a collimating lens 403 and a triangular prism 102. The thus collimated beam passes through a polarization beam splitter 103, converted into circularly polarized light by a quarter-wave plate 104, and then focused by an objective lens 404 onto a multilayer disc 501 (which is a double-layer disc in the drawing). The minimum spot position of laser light is located on a target layer 511. Reflected light 83 also comes from an adjacent layer 512 and produces stray light, which is a cause of crosstalk. The reflected light from the multilayer disc, including stray light, returns via the objective lens 404 and is converted by a quarter-wave plate 104 into linearly polarized light whose polarization is perpendicular to the original polarization direction. The linearly polarized light is therefore reflected by the polarization beam splitter 103 and directed to the condenser lens 405. A split wave plate 70 whose optical axis is set in a predetermined direction and a flat mirror 43 convert the polarization direction of the reflected light from the target layer perpendicularly, while causing no change to the reflected light from the adjacent layer in polarization direction.

Of the reflected light that returned to the condenser lens 405, the reflected light from the adjacent layer does not have its polarization direction changed, and it is therefore reflected by the polarization beam splitter 103. On the other hand, the reflected light from the target layer has its polarization direction rotated by 90°, and it therefore passes through the polarization beam splitter 103. Thus, the light that passes through the detection lens 406 is the reflected light from the target layer alone. The light that has passed through the detection lens 406 is detected by the photodetector 52. The photodetector consists of a four-quadrant detector when an astigmatic aberration method is employed. A focus error signal for controlling the focal position of the objective lens and a tracking error signal for tracking the groove of a rotating optical disc are produced in an electronic circuit 53. Such signals are used for the activation of actuators for controlling the position of the objective lens 404.

When the magnification m of the optical system composed of the condenser lens 405 and the objective lens 404 is ×22 and the focus lock-on range p is 1 μm, the lock-on range in the image space is 968 μm, which when converted into the distance from the reflecting plate is one half that, or 484 μm. This value is expressed by p×m². Further, when the interlayer distance from the adjacent layer is 25 μm and the refractive index of the optical disc is 1.62, the distance between the target layer and the adjacent layer in the image space is 14.9 mm. Thus, the distance at which the split wave plate 70 is placed from the flat mirror 43 is in the range of 14.9 mm or smaller and 484 μm or greater.

Embodiment 2

Figure 2:
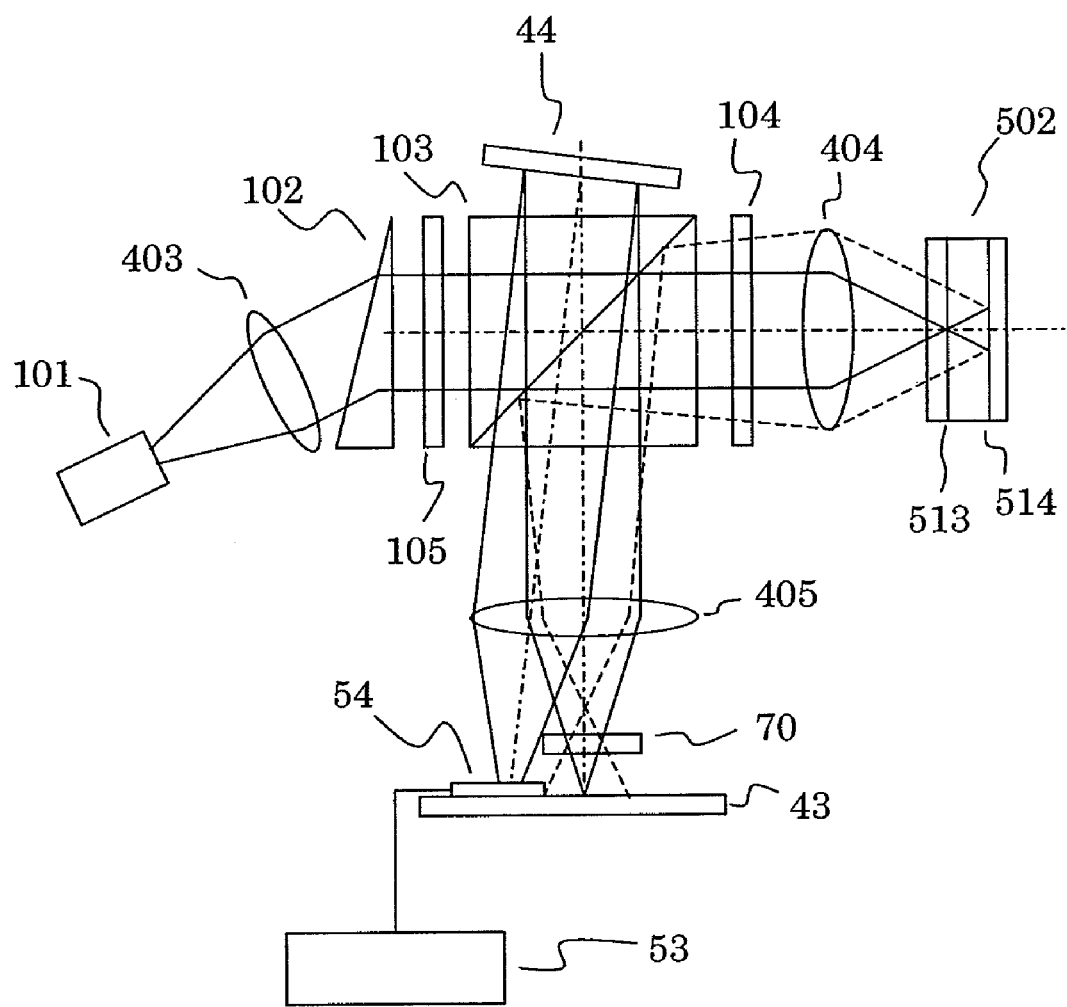
FIG. 2 shows an optical pickup portion of another example of the optical disc drive apparatus according to the invention.
Figure 3:
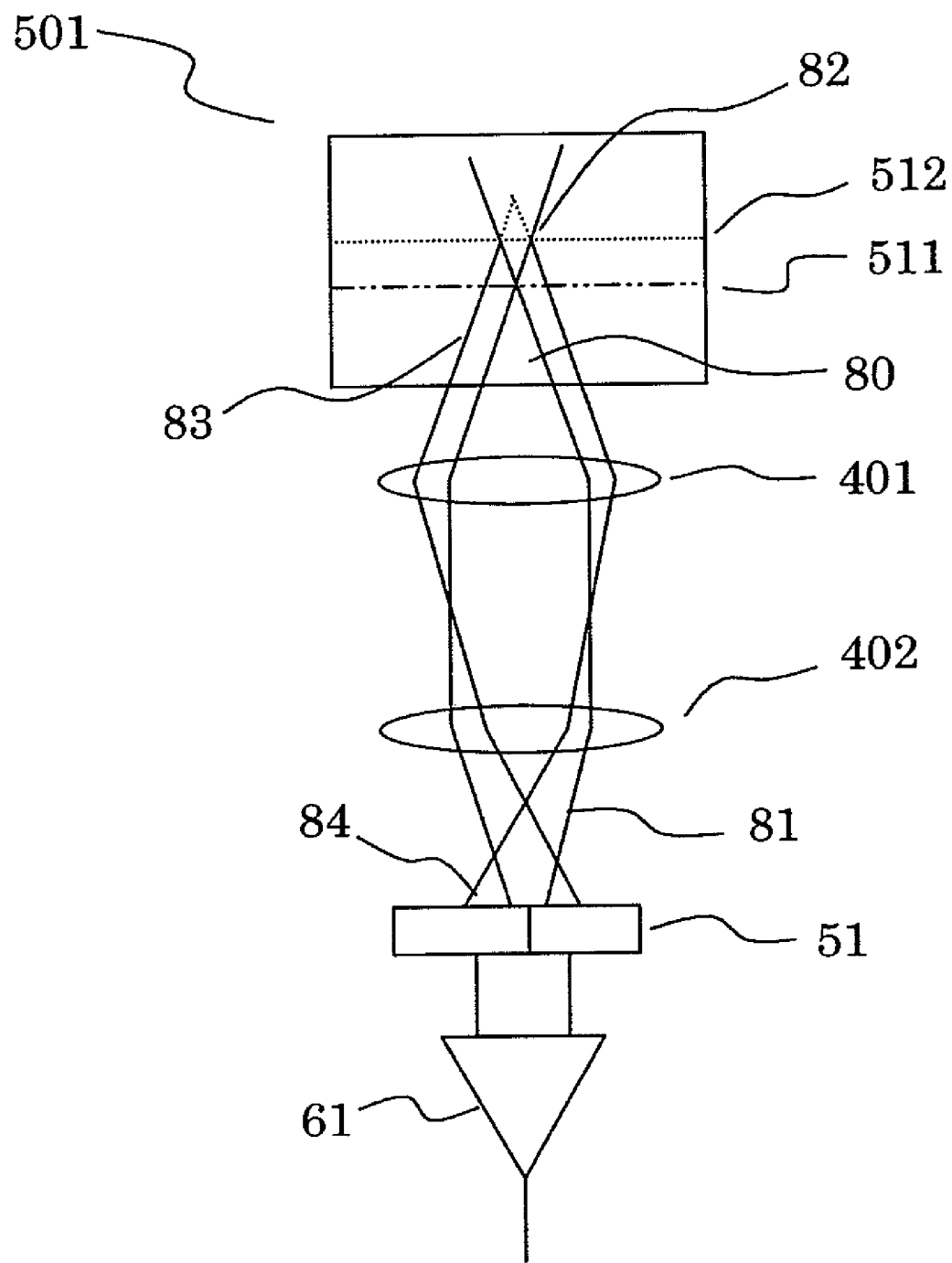
FIG. 3 illustrates the influence of reflected light from an adjacent layer.
Figure 4:
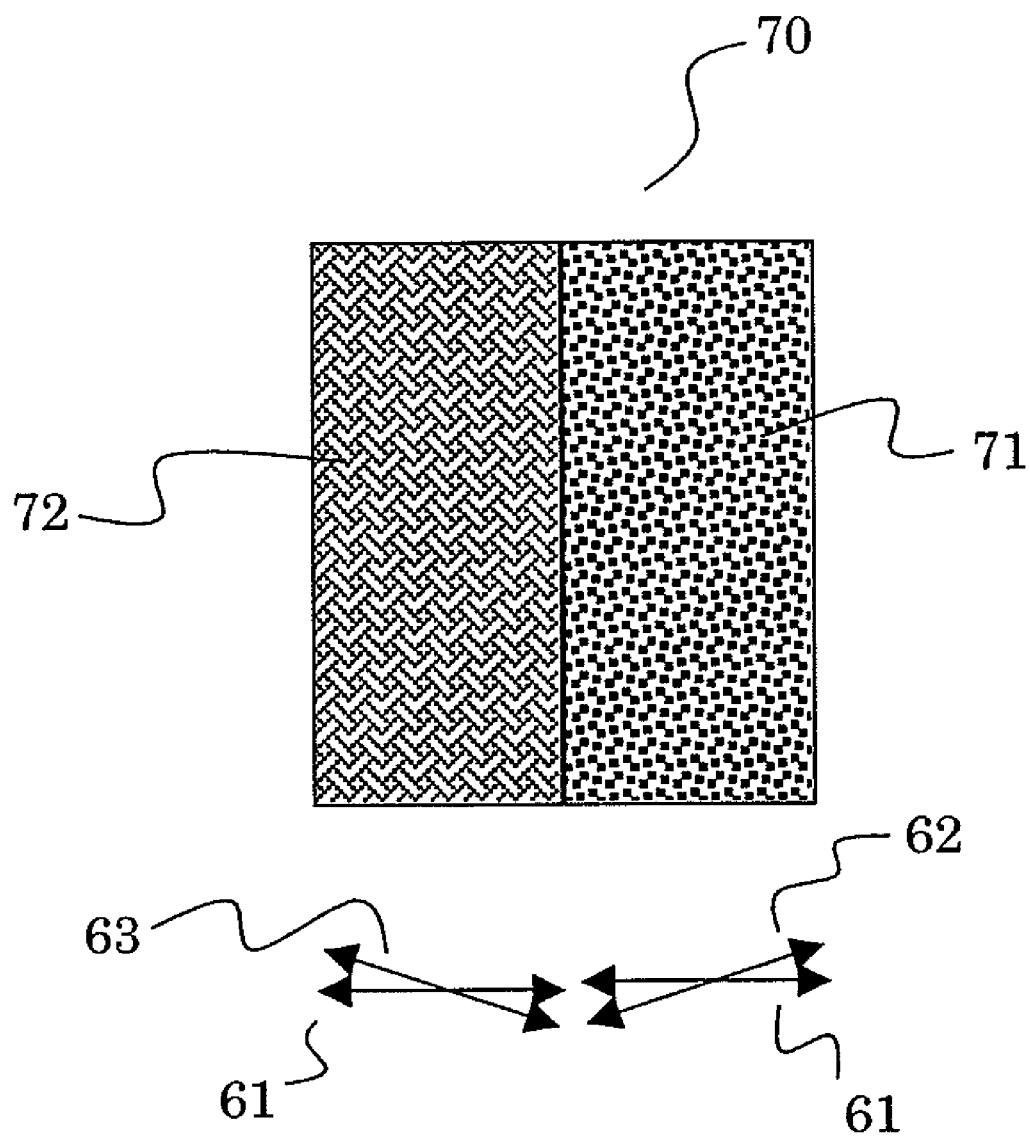
FIG. 4 shows the configuration of a λ/2 split wave plate.
Figure 5:
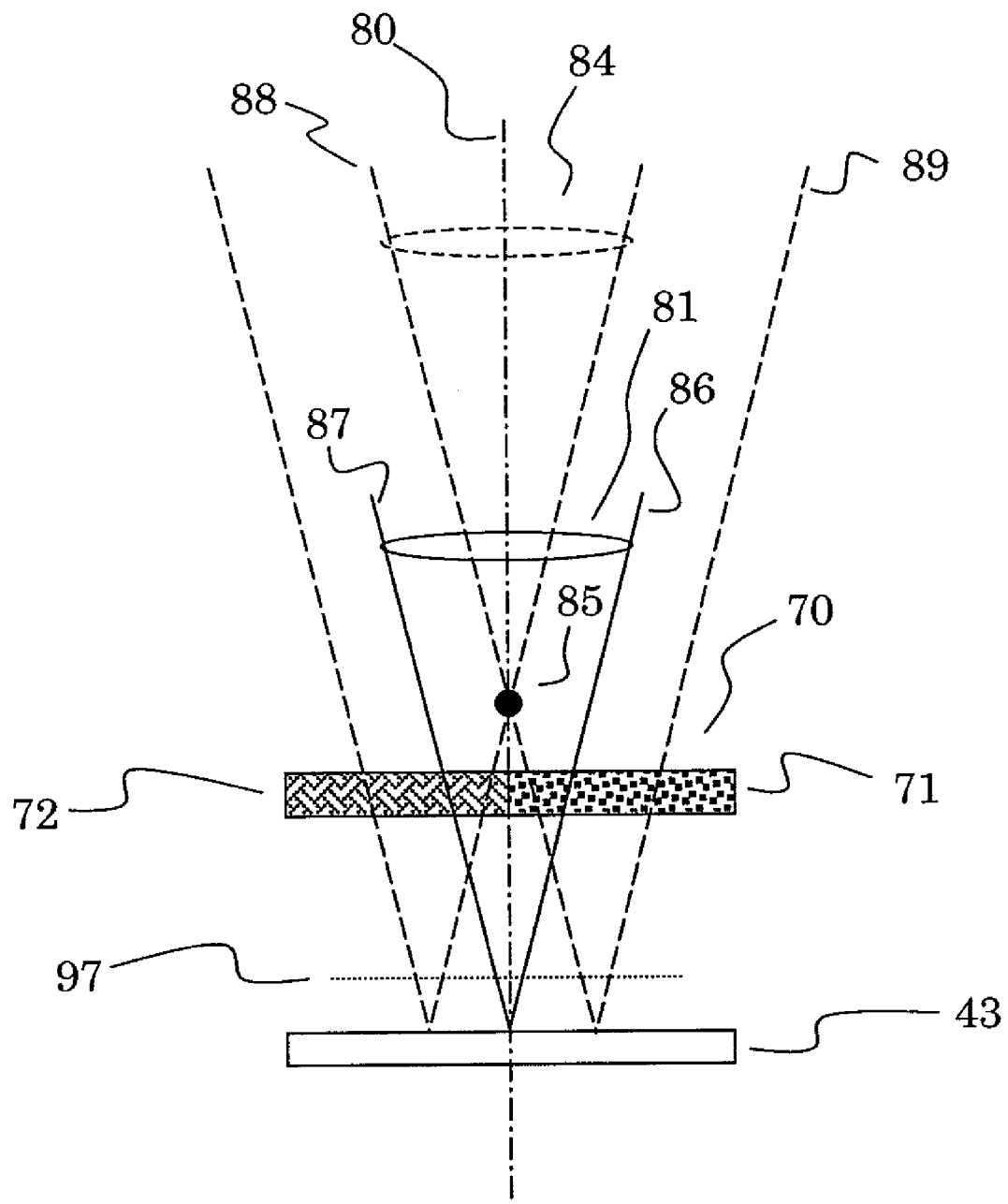
FIG. 5 shows how the reflected light from an adjacent layer farther from the objective lens and the reflected light from a target layer pass through the λ/2 split wave plate.
Figure 6:
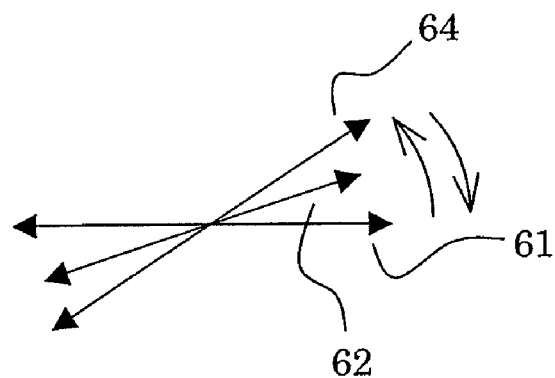
FIG. 6 shows how the polarization direction changes when passing through the same λ/2 split wave plate.
Figure 7:
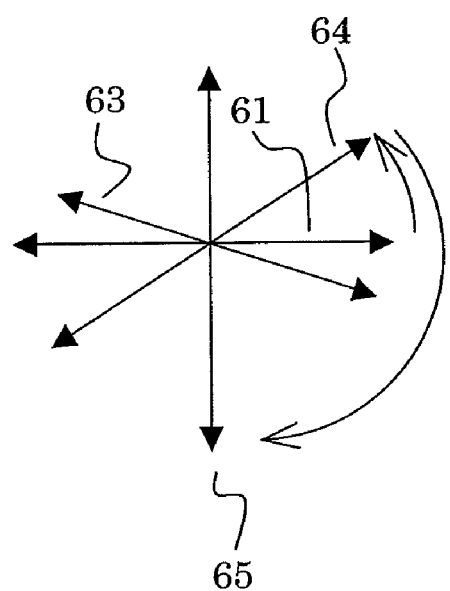
FIG. 7 shows how the polarization direction changes when passing through different λ/2 split wave plates.
Figure 8:
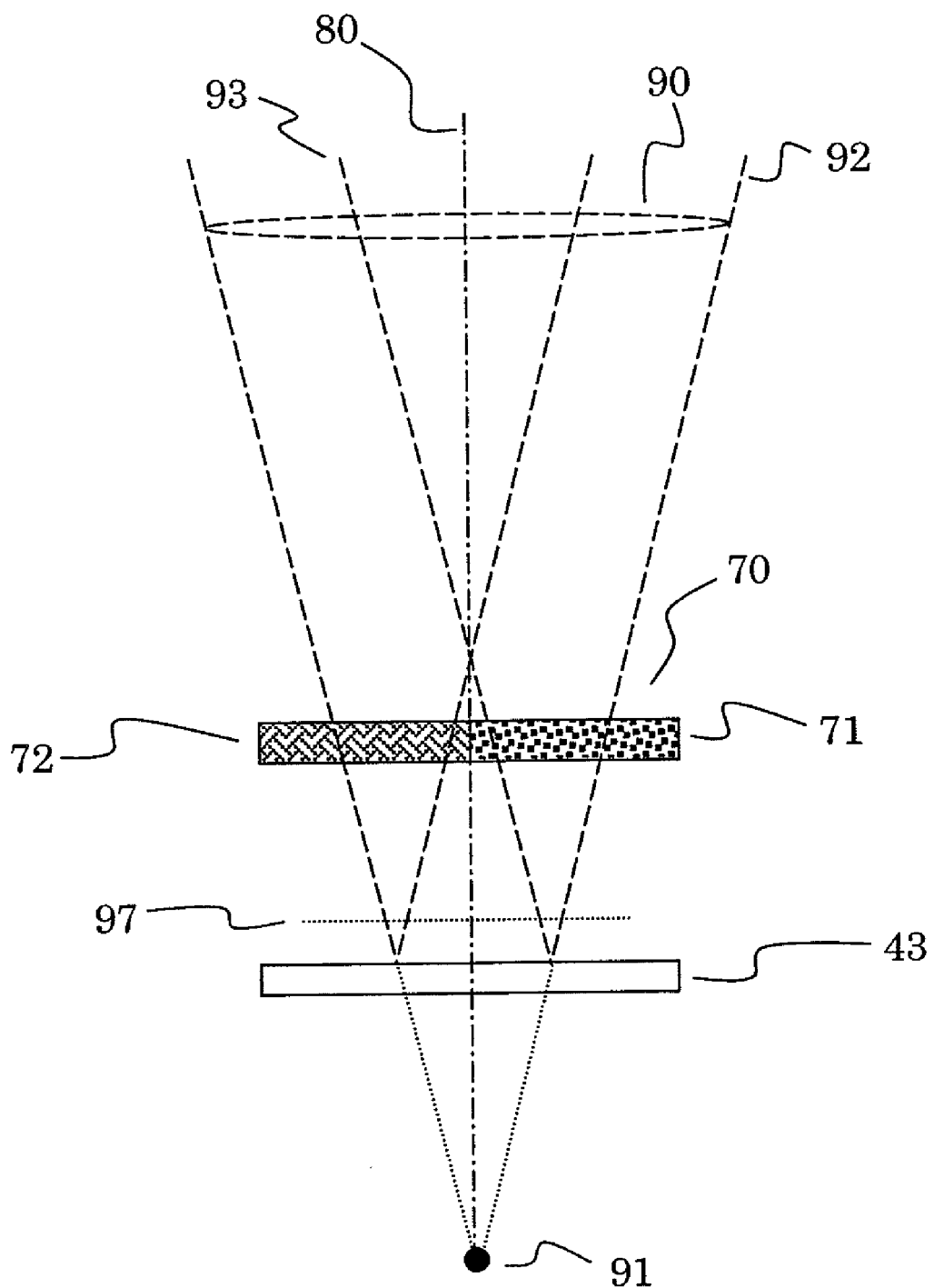
FIG. 8 shows how the reflected light from an adjacent layer closer to the objective lens and the reflected light from the target layer pass through the λ/2 split wave plate.
Figure 9:
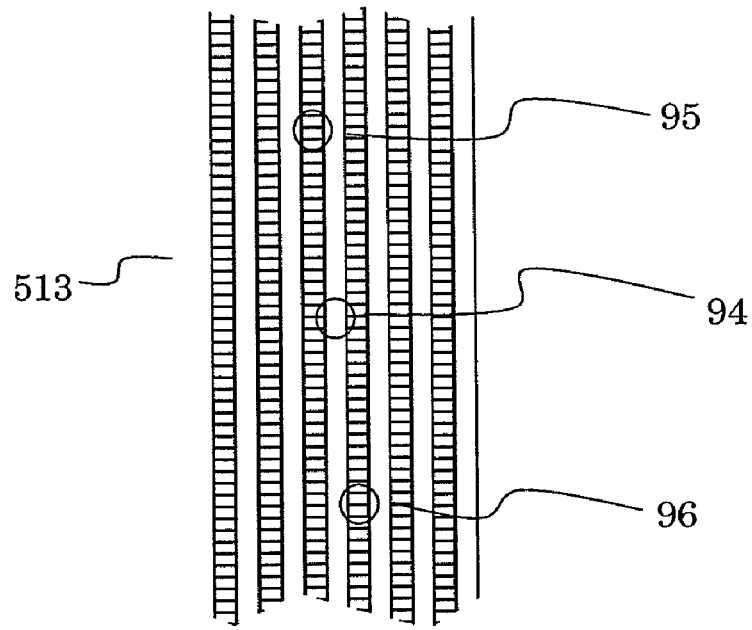
FIG. 9 shows a grooved recording surface being irradiated with one main beam and two sub beams.
Figure 10:
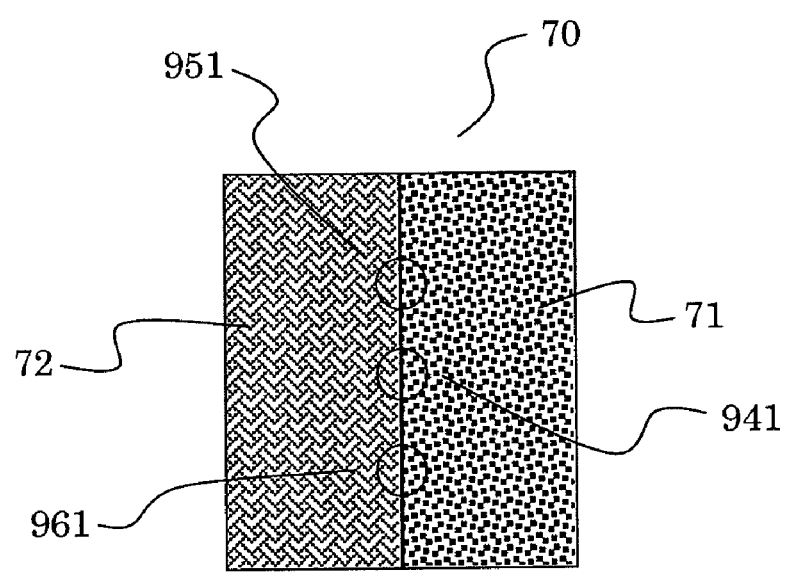
FIG. 10 shows the relationship between a split wave plate and reflected light.

FIG. 2 shows the optical pickup portion of another example of the optical disc drive apparatus according to the invention. The optical pickup of the present example employs two sub beams having smaller intensities, in addition to the main beam. In this configuration, a diffraction grating 105 is disposed immediately behind the triangular prism 102 so as to separate the laser light into the zero order light and the plus and minus first order lights. A grooved multilayer disc 502 includes grooved information recording layers 513 and 514. FIG. 9 shows a part of the recording surface of the information recording layer 513 closer to the objective lens 404, on which the laser light is focused. The figure shows an optical spot 94 of the main beam located at the center, and sub beams 95 and 96. The main beam irradiates a convex portion of the disc toward the objective lens side, while the sub beams irradiate concave portions. These three beams are reflected by the polarization beam splitter 103 and are then incident on the split wave plate 70, as shown in FIG. 10. The reflected light of each beam from the polarization beam splitter is incident on the split wave plate 70 in the form of main beam 941 and sub beams 951 and 961 such that their optical axes are aligned on the dividing line. Thus, in this case, the track direction and the dividing line are substantially identical, with the optical axes of the reflected lights positioned on the dividing line.

Of the reflected light including stray light, only the reflected light from the target layer is reflected by the flat mirror 43 and transmitted through the condenser lens 405 and the polarization beam splitter 103. The light that has passed through the polarization beam splitter 103 is reflected by the cylindrical mirror 44. The optical axis of the cylindrical mirror is inclined by 45 degrees with respect to the track direction and the cylindrical mirror 44 gives astigmatic aberration to the three reflected lights in terms of a 45 degree inclination with respect to the track direction. The direction of reflection is displaced from the optical axis of the original beam, so that the reflected light is incident on the photodetector 54 disposed on the flat mirror 43 with a displacement from the optical axis of the condenser lens 405.

Figure 11:
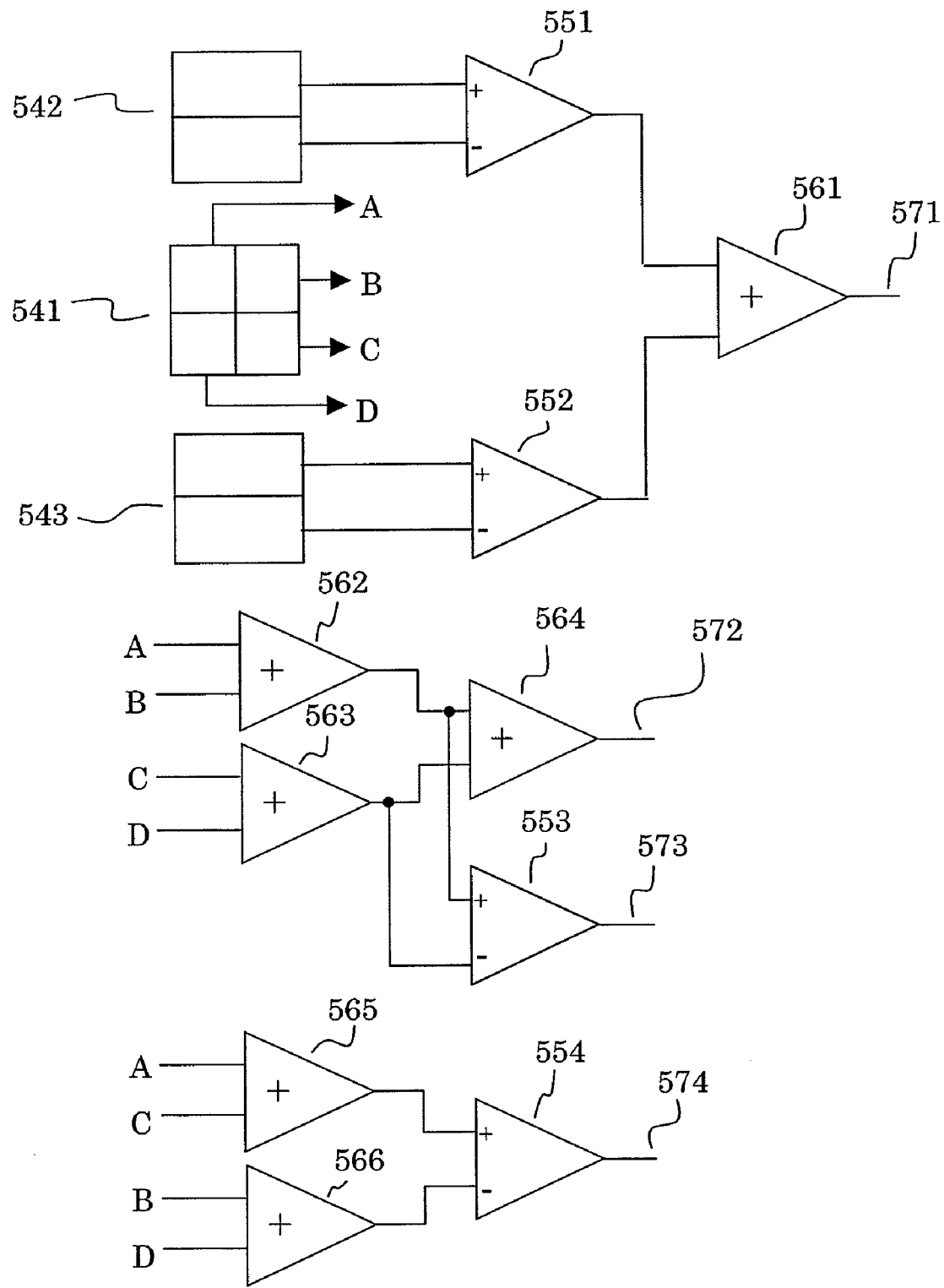
FIG. 11 shows the configuration of a photodetector for the detection of a main beam and sub beams, and a signal processing circuit.

FIG. 11 shows the configuration of the photodetector 54 and electronic circuits for signal processing. The photodetector is composed of a four-quadrant detector 541 for detecting the main beam and split detectors 542 and 543 for detecting the two sub beams. The dividing line of the split detector is perpendicular to the track direction. The electronic circuits include differential amplifiers 551 to 554 and adding circuits 561 to 566. A signal from each detector is amplified by a preamplifier and then processed in these electronic circuits into control signals or a data signal. Outputs A, B, C, and D from the four-quadrant detector are summed into a signal 572, which is a data signal. A signal 574 is a focus error signal used for an astigmatic focus-error detection technique. A signal 573 is a main push-pull signal. A signal 571 is a sub push-pull signal based on sub beams. While not shown in the drawing, a difference signal between the main push-pull signal and a constant multiple of the sub push-pull signal is used as a tracking error signal by which the radial movement of the objective lens 404 is controlled.

Embodiment 3

Figure 12:
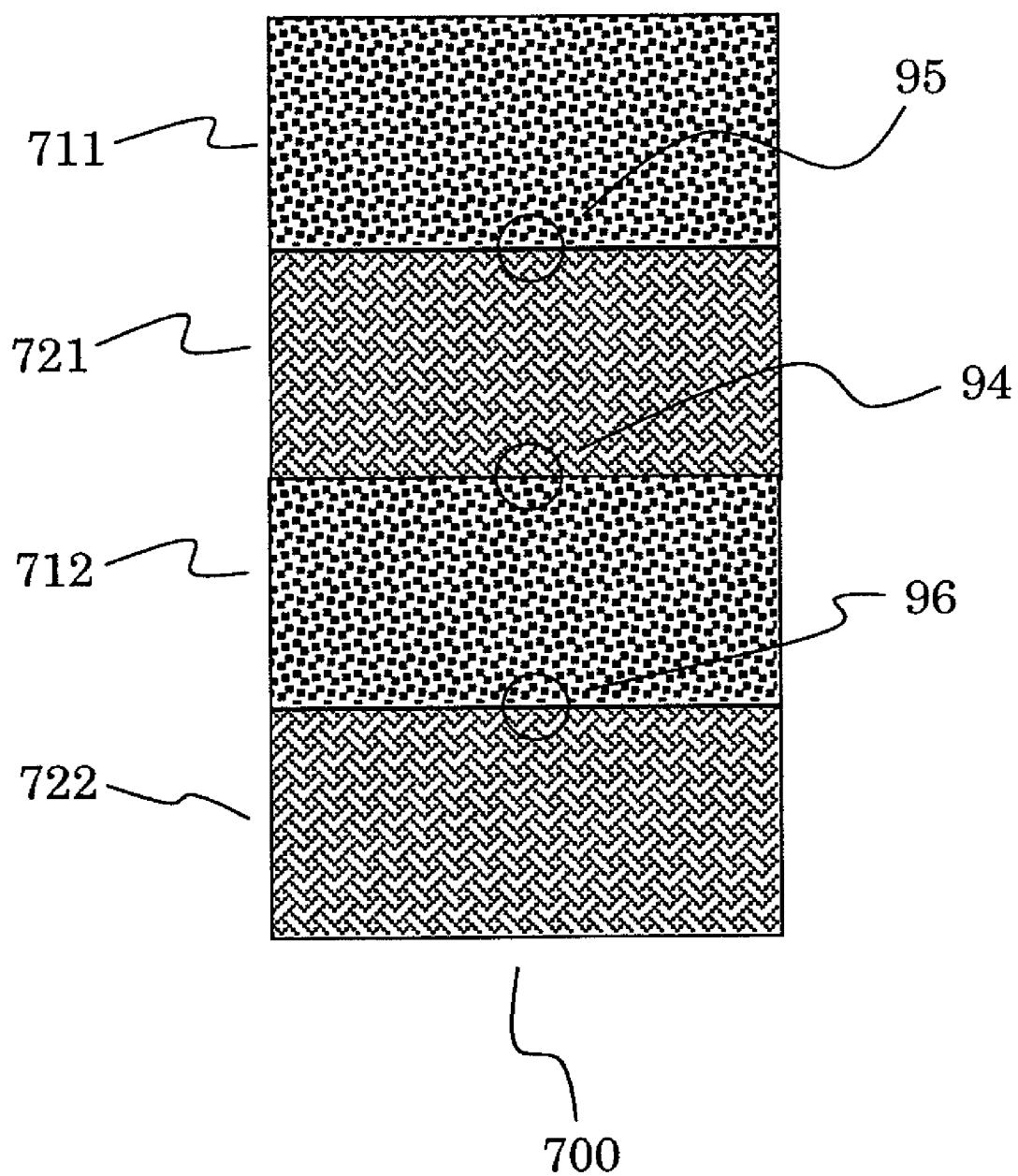
FIG. 12 shows the configuration of a split wave plate in which the dividing line is perpendicular to the track direction.

A split wave plate 700 according to the present embodiment is shown in FIG. 12. The split wave plate 700 is installed instead of the split wave plate 70 of FIG. 2. The split wave plate 700 consists of an alternate arrangement of wave plates having two kinds of optical axes, with their dividing direction perpendicular to the track direction. The optical axes of the half-wave plates 711 and 712 are at an angle of plus 22.5 degrees, while the optical axes of the half-wave plates 721 and 722 are at an angle of minus 22.5 degrees, with respect to the polarization direction of the reflected light from the multi-layer disc. The effects of the invention will be the same if the direction of the optical axes of the wave plates 711 and 712 is inclined by minus 22.5 degrees and the direction of the optical axes of the wave plates 721 and 722 is inclined by plus 22.5 degrees.

The main beam 94 is located on the dividing line defined by the wave plates 721 and 712. The sub beams 95 and 96 are located on the dividing line defined by the wave plates 711 and 721 and on the dividing line defined by the wave plates 712 and 722, respectively. Of the reflected light of the main and sub beams from the multilayer disc, the reflected light from an adjacent layer does not have its polarization direction changed. The reflected light from the adjacent layer, therefore, is reflected by the polarization beam splitter 103 and does not reach the cylindrical mirror 44. The reflected light from the target layer is transmitted by the polarization beam splitter 103, reflected by the cylindrical mirror 44, and then reaches the photodetector 54. Signals from the photodetector 54 are processed in the same way as in Embodiment 2 into a data signal, a focus error signal or a tracking error signal for focusing or tracking the objective lens 404.

In the present embodiment, the direction of movement of the objective lens for tracking coincides with the direction of the dividing line of the split wave plate. Thus, the optical axis of the reflected light is prevented from being displaced from the dividing line as the objective lens is moved. In this way, a high accuracy can be maintained during the separation of the reflected light from the adjacent layer and that from the target layer.

Figure 13:
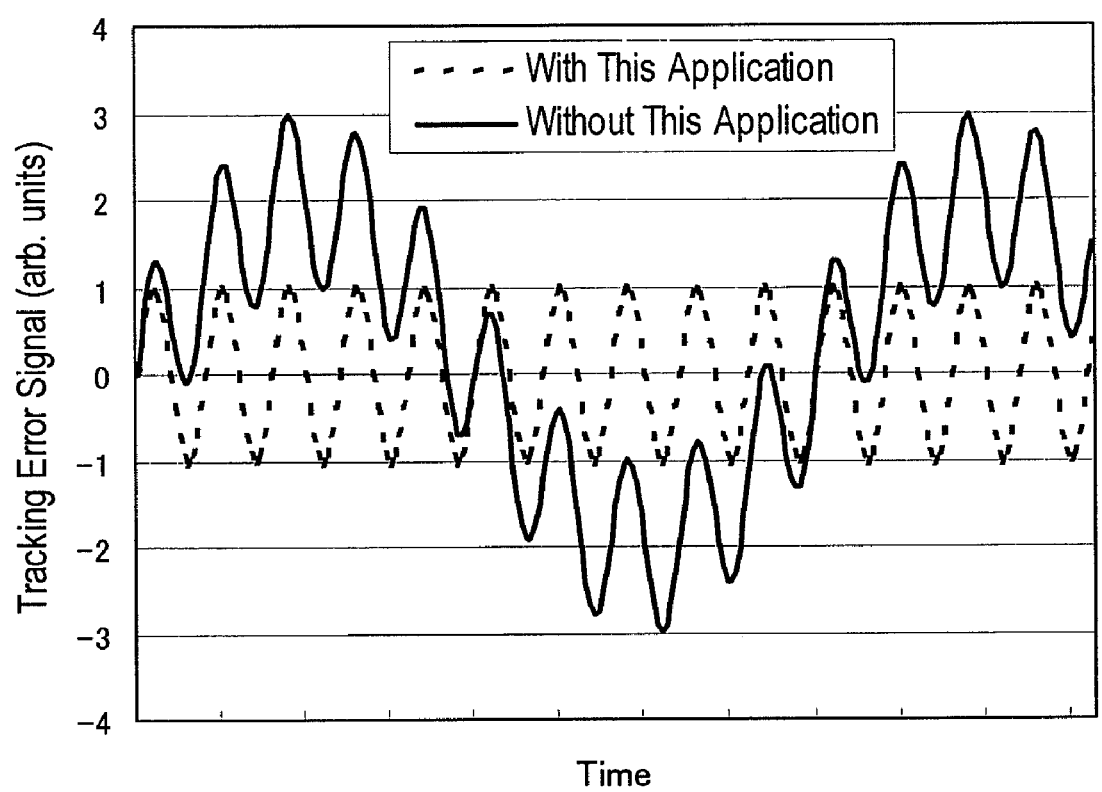
FIG. 13 shows changes in a sub push-pull signal.

FIG. 13 shows a push-pull signal obtained with the sub beams. The focal point of laser light is adjusted to a layer closer to the objective lens, and there is no tracking servo and hence no tracking. The laser light crosses a number of tracks due to the eccentricity of the rotating multilayer disc, thereby producing an oscillating push-pull signal. When the present invention is not applied, the signal waveform indicated with a solid line is produced, where the center of gravity of the push-pull signal fluctuates. This is due to the fact that the state of interference caused by the reflected light from another layer varies as the optical disc rotates. Such changes in the state of interference are caused by, e.g., the non-uniformity of the interlayer distance in the disc plane of the multilayer disc due to manufacturing error, or by the fact that the optical disc is not perfectly perpendicular to the rotating axis. If tracking servo is applied in this state, the center of gravity of the tracking error signal fluctuates and it becomes impossible to perform tracking. On the other hand, when the present invention is applied, interference from other layers is eliminated, so that there are no fluctuations in the center of gravity of the sub push-pull signal as indicated by the broken line, and a stable signal can be obtained. As a result, there is no tracking error, and defects in control signals in an optical disc drive apparatus for multilayered discs can be eliminated.

In accordance with the invention, the influence of the reflected light from an adjacent layer when reading a multi-layer optical disc in an optical disc drive apparatus can be reduced. When reading from or writing in a multilayered optical disc, it is necessary to accurately control the focal position of the laser light or tracking positions on the optical disc, by referring to error signals. If there is the reflected light from an adjacent layer, an error may be introduced into the focal position or the tracking position due to the displacement of an error signal caused by interference. That would make it impossible to read the data signal or determine the writing position accurately. In accordance with the invention, such problems can be eliminated. Further, crosstalk caused by the entry of such reflected light from an adjacent layer into a data signal can be reduced, thereby enhancing the quality of the data signal.

What is claimed is:

1. An optical disc drive apparatus comprising:
   a laser light source;
   an irradiating optical system including a polarization light beam splitter, a quarter-wave plate, and an objective lens, for focusing laser light from the laser light source and irradiating a multilayer optical information recording medium with the focused laser light;
   a detection optical system including the objective lens, the quarter-wave plate, the polarization light beam splitter, and a photodetector, for detecting reflected light from the multilayer optical information recording medium; and
   a separating optical system disposed between the polarization beam splitter and the photodetector, for rotating the polarization direction of reflected light from an adjacent layer by 90 degrees without rotating the polarization direction of reflected light from a target layer of the multilayer optical information recording medium.

2. The optical disc drive apparatus according to claim 1, wherein the separating optical system comprises:
   a split wave plate composed of a first half-wave plate and a second half-wave plate, the first λ/2 plate having an optical axis that is inclined by plus 22.5 degrees and the second λ/2 plate having an optical axis that is inclined by minus 22.5 degrees, with respect to the direction of polarization of the reflected light from the multilayer optical information recording medium, wherein the first and second half-wave plates are disposed in a plane perpendicular to the optical axis of the reflected light such that they are adjacent to each other along a dividing line in the plane that intersects the optical axis of the reflected light; and
   a flat mirror,
   wherein the flat mirror is disposed at a position at which the reflected light from the target layer is focused,
   the split wave plate is disposed between a focused spot position of the reflected light from a most adjacent layer to the target layer that is farther from the objective lens, or a focused spot position of the reflected light from a most adjacent layer that is closer to the objective lens after reflection by the flat mirror, and the flat mirror.

3. The optical disc drive apparatus according to claim 2, wherein the split wave plate is spaced apart from the flat mirror by a distance of $p \times m^2$ or more, where p is the focus lock-on range of the multilayer optical information recording medium, and m is the magnification of the optical system.

4. The optical disc drive apparatus according to claim 1, wherein the photodetector and the separating optical system are positioned on opposite sides across the polarization light beam splitter.

5. The optical disc drive apparatus according to claim 1, wherein the photodetector and the separating optical system are positioned on the same side of the polarization light beam splitter, the apparatus further comprising a reflector disposed on the opposite side of the photodetector and the separating optical system with respect to the polarization light beam splitter, the reflector reflecting the light from the separating optical system toward the photodetector.

6. The optical disc drive apparatus according to claim 2, wherein the irradiating optical system includes a light-dividing optical element disposed between the laser light source and the polarization beam splitter for dividing the laser light from the laser light source into one main beam and two sub beams positioned on either side of the main beam, wherein the three beams reflected by the multilayer optical information recording medium intersect the dividing line of the split wave plate.

7. The optical disc drive apparatus according to claim 2, wherein the irradiating optical system includes a light-dividing optical element disposed between the laser light source and the polarization light beam splitter for dividing the laser light from the laser light source into one main beam and two sub beams positioned on either side of the main beam, wherein the split wave plate is composed of an alternate arrangement of the first half-wave plate and the second half-wave plate such that they are adjacent to each other along three dividing lines perpendicular to the track direction, wherein each of the three beams reflected by the multilayer optical information recording medium intersects each of the three dividing lines.

* * * * *